(12) United States Patent
Fukuda et al.

(10) Patent No.: US 11,106,974 B2
(45) Date of Patent: Aug. 31, 2021

(54) PRE-TRAINING OF NEURAL NETWORK BY PARAMETER DECOMPOSITION

(71) Applicant: International Business Machines Corporation, Armonk, NY (US)

(72) Inventors: Takashi Fukuda, Yokohama (JP); Osamu Ichikawa, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1088 days.

(21) Appl. No.: 15/641,379

(22) Filed: Jul. 5, 2017

(65) Prior Publication Data

US 2019/0012594 A1 Jan. 10, 2019

(51) Int. Cl.
| | |
|---|---|
| *G06N 3/08* | (2006.01) |
| *G06N 3/04* | (2006.01) |
| *G10L 15/26* | (2006.01) |
| *G10L 15/16* | (2006.01) |
| *G10L 25/30* | (2013.01) |
| *G10L 15/14* | (2006.01) |
| *G06N 7/00* | (2006.01) |
| *G10L 15/06* | (2013.01) |

(52) U.S. Cl.
CPC ............... *G06N 3/08* (2013.01); *G06N 3/04* (2013.01); *G06N 3/0454* (2013.01); *G06N 3/084* (2013.01); *G06N 7/005* (2013.01); *G10L 15/144* (2013.01); *G10L 15/16* (2013.01); *G10L 15/26* (2013.01); *G10L 25/30* (2013.01); *G10L 15/063* (2013.01)

(58) Field of Classification Search
CPC .......... G06N 3/08; G06N 3/04; G06N 3/0454; G06N 3/084; G06N 7/005
See application file for complete search history.

(56) References Cited

U.S. PATENT DOCUMENTS

| | | |
|---|---|---|
| 5,596,681 A | 1/1997 | Tamura |
| 9,235,799 B2 | 1/2016 | Yu et al. |
| 9,418,334 B2 | 8/2016 | Sainath et al. |
| 2013/0138436 A1 | 5/2013 | Yu et al. |
| 2013/0304395 A1 | 11/2013 | Naidu et al. |
| 2014/0372112 A1 | 12/2014 | Xue et al. |

(Continued)

FOREIGN PATENT DOCUMENTS

| | | |
|---|---|---|
| WO | 02061679 A2 | 8/2002 |
| WO | 2015011688 A2 | 1/2015 |

OTHER PUBLICATIONS

Kilgour et al., "Growing a Deep Neural Network Acoustic Model with Singular Value Decomposition", Dec. 2016, VDE, all pages (Year: 2016).*

(Continued)

*Primary Examiner* — Daniel C Puentes
(74) *Attorney, Agent, or Firm* — Aaron N. Pontikos

(57) ABSTRACT

A technique for training a neural network including an input layer, one or more hidden layers and an output layer, in which the trained neural network can be used to perform a task such as speech recognition. In the technique, a base of the neural network having at least a pre-trained hidden layer is prepared. A parameter set associated with one pre-trained hidden layer in the neural network is decomposed into a plurality of new parameter sets. The number of hidden layers in the neural network is increased by using the plurality of the new parameter sets. Pre-training for the neural network is performed.

15 Claims, 7 Drawing Sheets

(56) References Cited

U.S. PATENT DOCUMENTS

| | | |
|---|---|---|
| 2015/0170020 A1 | 6/2015 | Garimella |
| 2015/0269933 A1* | 9/2015 | Yu .......................... G10L 25/21 704/232 |
| 2016/0026914 A1 | 1/2016 | Yu et al. |
| 2017/0024642 A1 | 1/2017 | Xiong et al. |

OTHER PUBLICATIONS

Sainath et al., "Deep Convolutional Neural Networks for LVCSR", 2013 IEEE, all pages (Year: 2013).*

Fukuda et al., "Pre-Training of Neural Network by Parameter Decomposition", U.S. Appl. No. 16/378,696, filed Apr. 9, 2019 pp. 1-29.

IBM Appendix P., "List of IBM Patents or Patent Applications to be Treated as Related", Dated Apr. 9, 2019, 2 pages.

Henderson, James, "Discriminative Training of a Neural Network Statistical Parser", Proceeding ACL '04, Proceedings of the 42nd Annual Meeting on Association for Computational Linguistics, Article No. 95, Barcelona, Spain, Jul. 21-26, 2004, 8 pages.

Fukuda et al., "Pre-Training of Neural Network by Parameter Decomposition", U.S. Appl. No. 15/887,304, filed Feb. 2, 2018 pp. 1-29.

IBM Appendix P., "List of IBM Patents or Patent Applications to be Treated as Related", Dated Feb. 2, 2018, 2 pages.

Vesely et al. "Sequence-discriminative training of deep neural networks", Interspeech 2013, Copyright © 2013 ISCA, Aug. 25-29, 2013, Lyon, France, 5 pages.

* cited by examiner

PRE-TRAINING OF NEURAL NETWORK BY PARAMETER DECOMPOSITION

BACKGROUND OF THE INVENTION

The present disclosure, generally, relates to machine learning techniques, and more particularly, to technique for training a neural network including an input layer, one or more hidden layers and an output layer.

It has been known that pre-training neural networks before fine-tuning can improve automatic speech recognition (ASR) performance, especially when the amount of training data is relatively small. There are several known pre-training techniques including discriminative pre-training that is based on an error back-propagation and generative pre-training that does not use discriminative information.

In conventional pre-training processes, a new layer initialized with random parameters is inserted to the top of the hidden layers just below the output layer. Then, the neural network is pre-trained using the training data.

SUMMARY

According to an embodiment of the present invention there is provided a computer-implemented method for training a neural network that includes an input layer, one or more hidden layers and an output layer. The method includes preparing a base of neural network, which includes at least a pre-trained hidden layer. The method also includes decomposing a parameter set associated with one pre-trained hidden layer in the neural network into a plurality of new parameter sets. The method further includes increasing the number of the hidden layers in the neural network based at least in part on the plurality of the new parameter sets. The method includes further performing pre-training for the neural network.

Computer systems and computer program products relating to one or more aspects of the present invention are also described and claimed herein.

According to other embodiment of the present invention there is provided a computer-implemented method for training a neural network that includes an input layer, one or more hidden layers and an output layer. The method includes preparing a base of the neural network. The method also includes repeatedly performing insertion of a new hidden layer into the neural network and pre-training for the neural network until the number of the hidden layers in the neural network reaches a predetermined number while a position to be inserted the new hidden layer is identical to a position having been inserted in a previous stage.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The forgoing and other features and advantages of the invention are apparent from the following detailed description taken in conjunction with the accompanying drawings in which:

DETAILED DESCRIPTION

Now, the present invention will be described using particular embodiments, and the embodiments described hereafter are understood to be only referred to as examples and are not intended to limit the scope of the present invention.

One or more embodiments according to the present invention are directed to computer-implemented methods, computer systems and computer program products for training a neural network including an input layer, one or more hidden layers and an output layer, in which the trained neural network can be used for a task such as speech recognition.

Referring to the series of FIGS. 1-6, there are shown a computer system and a method for training an acoustic model based on a neural network according to some embodiments of the present invention.

Figure 1:
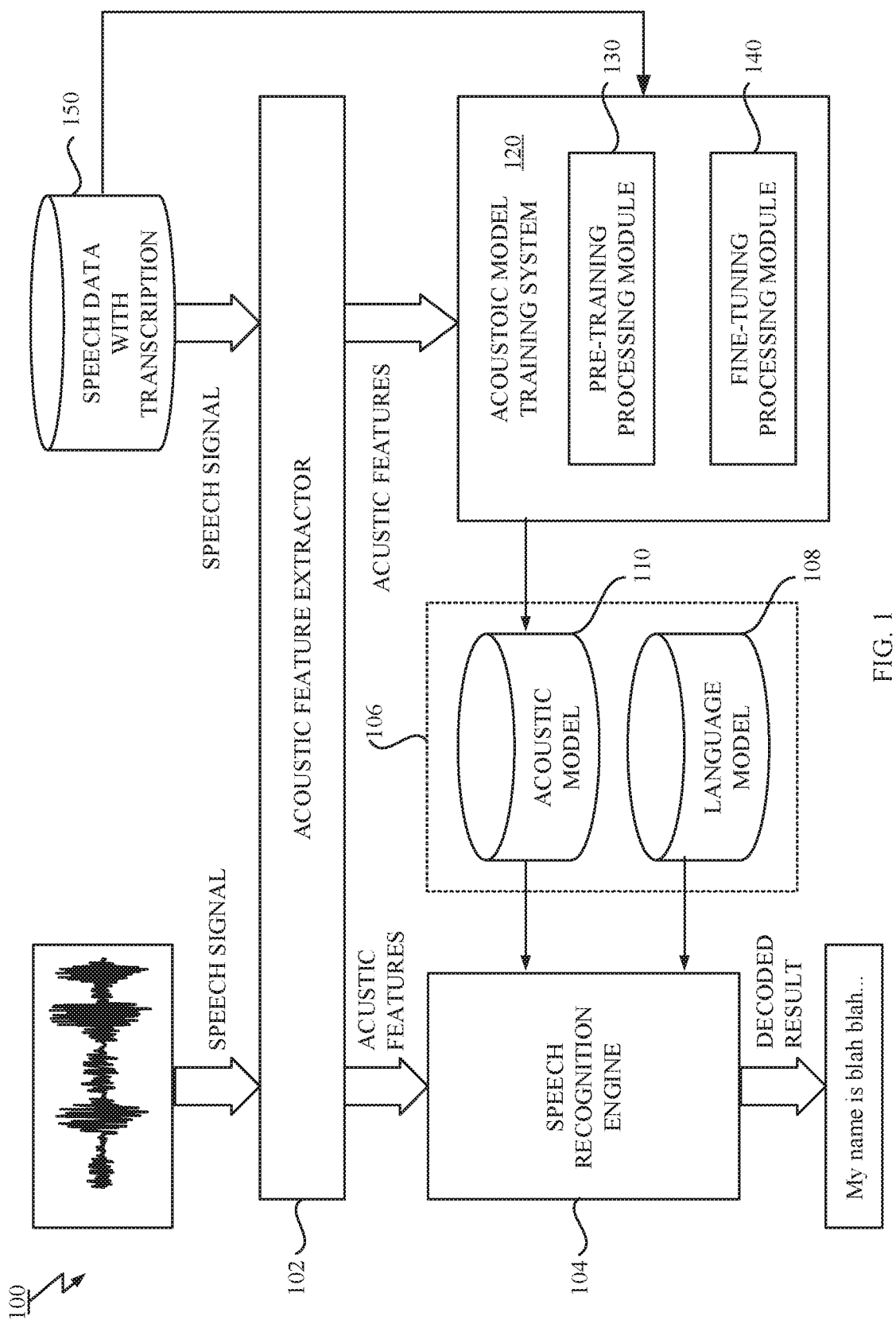
FIG. 1 illustrates a block diagram of a speech recognition system that includes an acoustic training system for training a neural network based acoustic model in accordance with at least one embodiment of the present invention.

Referring to FIG. 1, a block diagram of a speech recognition system that includes an acoustic model training system in accordance with at least one embodiment of the present invention is illustrated. As shown in FIG. 1, the speech recognition system 100 may include an acoustic feature extractor 102 that receives speech signals and extracts acoustic features from the received speech signals; a speech recognition engine 104 that receives the extracted acoustic features and outputs a decoded result based on given speech recognition models 106; and an acoustic model training system 120.

The acoustic feature extractor 102 receives the speech signals digitalized by sampling analog audio input, which may be input from a microphone for instance, at a predetermined sampling frequency and a predetermined bit depth. The acoustic feature extractor 102 extracts the acoustic features from the received speech signal by any known acoustic feature analysis and then outputs a sequence of the extracted acoustic features. The speech signal may be provided as an audio file, an audio stream from input device such as microphone, or an audio stream via network socket.

In one or more embodiments, the acoustic features may include, but not limited to, MFCC (Mel Frequency Cepstral Coefficient), LPC (Linear Predictive Coding) Coefficient, PLP (Perceptual Liner Prediction) Cepstral Coefficient, log Mel spectrum, raw input features, or any combinations thereof. The acoustic features may further include dynamical features such as delta features and delta-delta features of the aforementioned acoustic features.

The speech recognition engine 104 receives the sequence of the extracted acoustic features and predicts most plausible speech contents based on the speech recognition models 106.

The speech recognition models 106 may include a language model 108 and an acoustic model 110. The language model 108 is a model representing probability distribution of word sequence and may be, but not limited to, n-gram model or neural network based model. The acoustic model 110 is a model representing relationship between input acoustic features and linguistic units constituting a speech. Among the speech recognition models 106, the acoustic model 110 may be a target of the novel training function according at least one embodiment of the present invention. The acoustic model 110 will be described in more detail later.

The speech recognition engine 104 finds a word sequence with maximum likelihood based on the sequence of the acoustic features provided from the acoustic feature extractor 102 by integrating the language model 108 and the acoustic model 110, and outputs the word sequence found as the decoded result.

The acoustic model training system 120 performs the training process according to an embodiment of the present invention to build the acoustic model 110. In some embodiments, the acoustic model 110 is a neural network based model that includes a neural network having an input layer, one or more hidden layers and an output layer.

The acoustic model training system 120 uses a given set of training data to build the acoustic model 110. In some embodiments, speech data 150 with transcription is provided as the set of the training data. The speech data 150 include a plurality of utterances and corresponding transcriptions. The speech data 150 may be stored in a storage device operably coupled to a processing circuitry.

In some embodiments, a two-steps training process including pre-training process and fine-tuning process is conducted by using the given set of the training data. For this purpose, the acoustic model training system 120 may include a pre-training processing module 130 for performing pre-training process that builds up the neural network with parameters in layer-by-layer manner; and a fine-tuning processing module 140 for discriminatively updating parameters of the neural network based upon the parameters given by the pre-training processing module 130.

Figure 2:
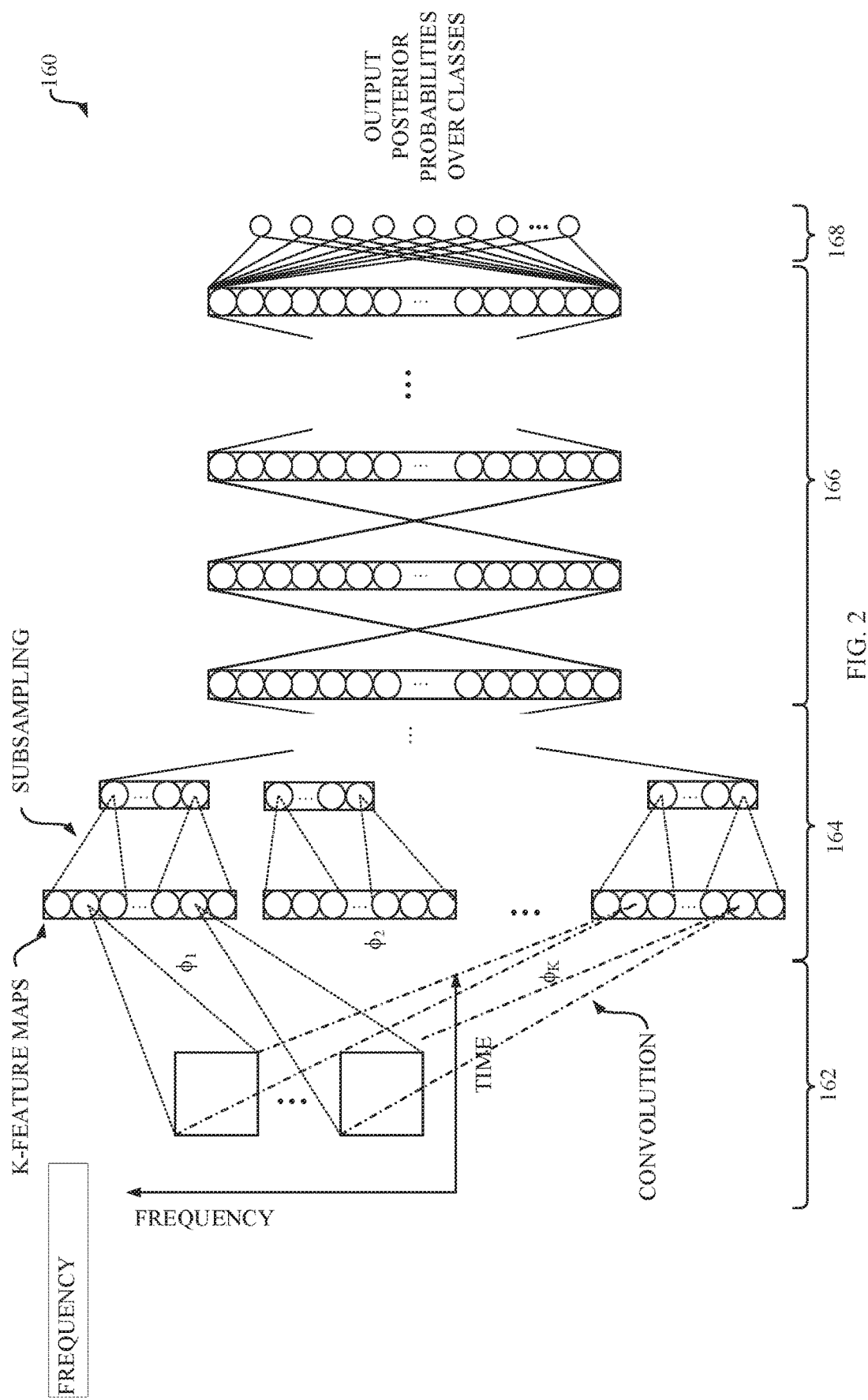
FIG. 2 depicts an architecture of a neural network used for an acoustic model, which is a target of a novel training function in accordance with at least one embodiment of the present invention.

Referring to FIG. 2, an architecture of a neural network, which can be used for the acoustic model 110 for speech recognition, is shown. The neural network 160 shown in FIG. 2 is one example of such neural network to which the novel training process can be applicable.

The neural network 160 depicted in FIG. 2 includes an input layer 162, one or more convolutional layers 164, one or more fully-connected layers 166 and an output layer 168. The neural network 160 shown in FIG. 2 has a typical configuration of CNN (Convolutional Neural Network), which is one of the most promising models used in a variety of recognition processing such as speech recognitions, image recognitions, motion recognitions, etc.

A plurality of consecutive feature frames may be used as input for the neural network 160. Each feature frame includes a plurality of features extracted from original speech signal by the acoustic feature extractor 102. In a particular embodiment, the input for the neural network 160 can be represented as two-dimensional space in time (e.g. frames) and frequency (e.g. frequency band) axes as shown in FIG. 1. Also, the input for the neural network 160 can be represented by using further other dimension such as feature types. For example, the number of feature types may be three when static features, delta feature, and delta-delta features are used.

The one or more convolutional layers 164 may include one or more sets of a convolutional layer followed by a subsampling layer. A hidden unit in the convolutional layer takes inputs from a rectangular local window spanning time and frequency axes (e.g. N frames×M frequency bands, etc.) with one or more feature types (e.g. static/delta/delta-delta) in the input layer 162, and multiplies those local inputs by using a localized filter ($\phi_i$) that extracts local features from the input. The convolutional layer accommodates totally K feature maps generated with different localized filters $\phi_i$ (i=1, . . . , K), where K denotes the number of localized filters. The subsampling layer takes inputs from a local region of the previous convolutional layer and down-samples the inputs with a subsampling operation, which may be, but not limited to, any one of max-pooling, average pooling and stochastic pooling.

The one or more fully-connected layers 166 take output of all units from the previous layer to perform class discrimination. The one or more fully-connected layers 166 may be made up of one or more hidden layers with a plurality of hidden units, each of which has full connections to all units in the previous layer. The output layer 168 outputs posterior probability over targets corresponding to central frame while each input of the neural network 160 is constituted from consecutive feature frames centering at time.

Note that states of HMMs, which may be mono-phone HMMs or multi-phone HMMs, are used as the targets for class discrimination. The mono-phone HMMs are context-independent models. On the other hand, the multi-phone HMMs are context-dependent models. One of the models is a quin-phone model where each distinct phone model for every different two left and two right phone contexts is used.

The number of the sets in the one or more convolutional layers 164 and the number of the hidden layers in the one or more fully-connected layers 166 may be set to appropriate numbers, respectively. The one or more fully-connected layers 166 may or may not include a bottleneck layer before the output layer 168.

The input is fed into the input layer 162 in the neural network 160 and then the neural network 160 outputs result from the output layer 168. In automatic speech recognition systems (ASRs), the neural network 160 may output observation probability over HMM states for input acoustic features.

Parameters of the neural network 160, which may include weights between each units and biases of each unit, are optimized by training algorithm so as to classify the input correctly. Typically, the neural network 160 are first subjected to pre-training process by the pre-training processing module 130 and then fine-tuning process by the fine-tuning processing module 140.

Figure 3:
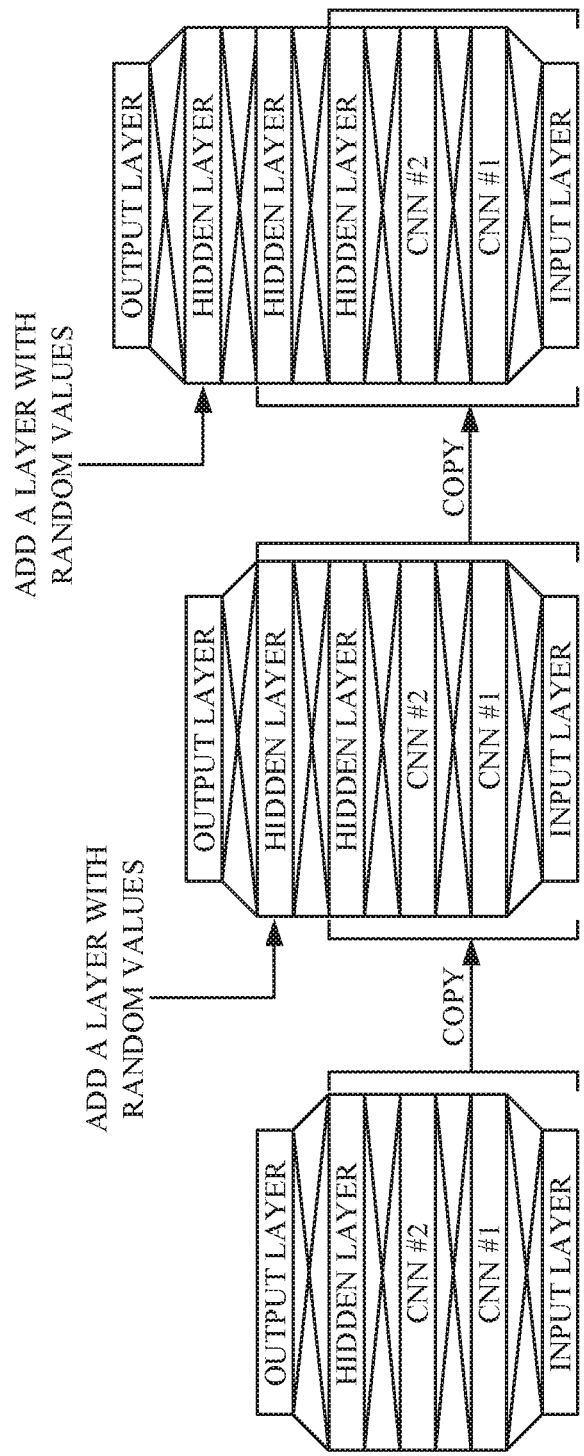
FIG. 3 describes a standard way of inserting a new hidden layer into a neural network during pre-training process in accordance with at least one embodiment of the present invention.

Referring to FIG. 3, a standard way of inserting a new hidden layer into a neural network during a pre-training process is described. As shown in FIG. 3, in the standard pre-training process, generally, one new hidden layer is inserted with parameters that are initialized with random values on a top of current structure of the neural network just below an output layer and pre-trained based upon the randomly initialized parameters.

However, there is no physical meaning in initializing parameters of the hidden layers with random values. Also, there is no physical meaning in inserting a new layer on top of the structure just below the output layer. Since the initial parameters of the neural network 160 may affect a result of subsequent training, there is room for improvement on parameter initialization before the subsequent training.

Figure 4:
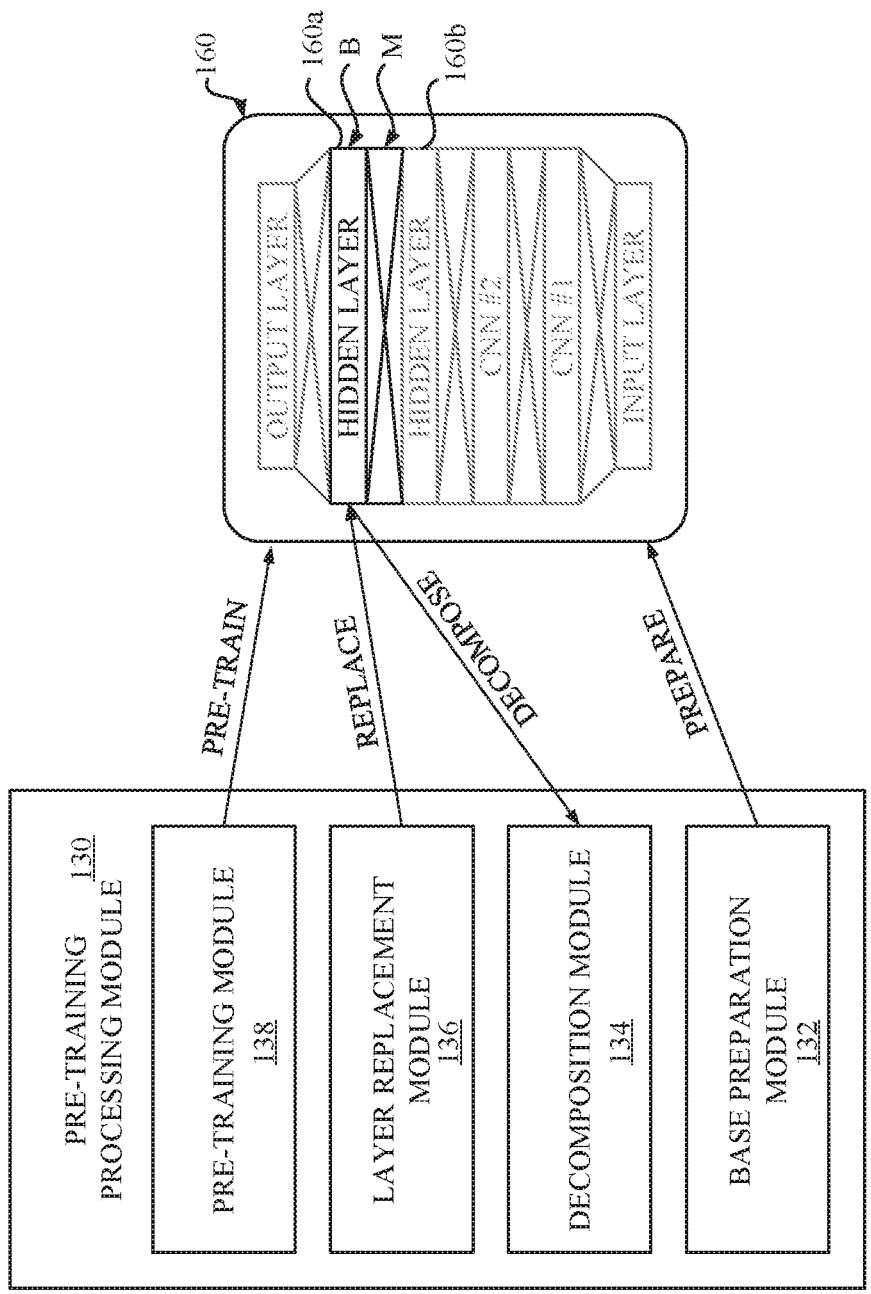
FIG. 4 illustrates a more detailed block diagram of a pre-training processing module in accordance with at least one embodiment of the present invention.

By referring to FIG. 4, a more detailed block diagram of the pre-training processing module 130 is described. As shown in FIG. 4, the pre-training processing module 130 may include a base preparation module 132; a decomposition module 134; a layer replacement module 136 and a pre-training module 138.

A set of training data are generated from the speech data 150 with transcription via the acoustic feature extractor 102. Each training data includes acoustic features having the size of the local window and feature types, and an associated class label. Any one of phones including mono-phone HMM states and multi-phone HMM states or syllable may be used as the class label.

The pre-training processing module 130 perform pre-training process that finds representation that well captures characteristics of input and stack layers with initial parameters for the subsequent fine-tuning process in a layer-by-layer manner.

The base preparation module 132 is configured to prepare a base of the neural network 160 as an initial condition for the pre-training process. The base of the neural network 160 may include the one or more convolutional layers 164 and one or more hidden layers corresponding to a part of the fully-connected layers 166. The one or more convolutional layers 164 and the one or more hidden layers can be pre-trained by any known pre-training technique using the given set of the training data. Thus, the base of the neural network 160 prepared by the base preparation module 132 may have at least one pre-trained hidden layer corresponding to one of the fully-connected layers 166.

The decomposition module 134 is configured to decompose a parameter set associated with one pre-trained hidden layer 160a in the neural network 160 into a plurality of new parameter sets. One of the pre-trained hidden layers in current structure of the neural network 160, which corresponds to one of the fully-connected layers 166, is targeted for parameter decomposition. The parameters associated with the one pre-trained hidden layer 160a may include a weight matrix M associated with the one pre-trained hidden layer 160a and a lower layer 160b below the one pre-trained hidden layer 160a and a bias vector B associated with the one pre-trained hidden layer 160a. In a particular embodiment, the weight matrix M associated with the one pre-trained hidden layer 160a can be used as the parameter set to be decomposed by the decomposition module 134.

In one or more embodiments, the parameter set can be decomposed by applying any known matrix decomposition technique to a matrix representing the parameter set. In a preferable embodiment, matrix decomposition technique that decomposes the matrix into multiple orthogonal matrices can be employed. In a further preferable embodiment, the parameter set can be decomposed by applying singular value decomposition (SVD) to the matrix to generate a first orthogonal matrix, a singular value matrix and a second orthogonal matrix.

In the particular embodiment where the weight matrix M is used as the parameter set to be decomposed, the weight matrix M associated with the one pre-trained hidden layer 160a can be decomposed as follows:

$$M = U\Sigma V^T,$$

where M denotes an original weight matrix before decomposition, U denotes a first orthogonal weight matrix after the SVD, $\Sigma$ denotes a singular value matrix and V denotes a second orthogonal weight matrix after the SVD.

The new parameter sets generated by the decomposition module 134 may be based at least in part on the first orthogonal matrix U, the singular value matrix $\Sigma$ and the second orthogonal matrix V. In a particular embodiment where the weight matrix M is used as the parameter set to be decomposed, a first new parameter set of the plurality of the new parameter sets may have a new weight matrix that is the first orthogonal matrix U, and a second new parameter set of the plurality of the new parameter sets may have a new weight matrix that is a matrix product of the singular value matrix and the transposed second orthogonal matrix $\Sigma V^T$.

The layer replacement module 136 is configured to increase the number of the hidden layers in the neural network 160 based at least in part on the plurality of the obtained new parameter sets. The layer replacement module 136 may replace the one pre-trained hidden layer 160a, whose parameter has been decomposed by the decomposition module 134, with multiple new hidden layers, more specifically two new hidden layers. In some embodiments, the layer replacement module 136 may set the first and second new parameter sets to upper and lower layers of the two new hidden layers, respectively, as initial conditions for subsequent pre-training, in a manner such that the two new hidden layers becomes equivalent to (at least approximates) the original pre-trained hidden layer 160a as expressed by the following equation:

$$Mx = (UW)x = U(Wx),$$

where W denotes $\Sigma V^T$ and x denotes an input vector.

The first new parameter set U may be set as a weight matrix of connections between the upper and lower layers. The second new parameter set W ($=\Sigma V^T$) may be set as a weight matrix of connections between the lower layer and further lower hidden layer 106b below the original pre-trained hidden layer 106a.

Note that if one pre-trained hidden layer 160a connected to a lower hidden layer 160b having the same number of hidden units is targeted for the parameter decomposition and the replacement, the one pre-trained hidden layer 160a may be replaced by two new hidden layers having the same number of hidden units since the weight matrix M between two layers is regular and obtained orthogonal weight matrices U, V and the singular value matrix $\Sigma$ are also regular. However, one pre-trained hidden layer targeted for the parameter decomposition and the replacement is not limited to one connected to the lower hidden layer having the same number of hidden units. In other embodiments, one pre-trained hidden layer connected to a lower hidden layer having different number of hidden units can be also targeted for the parameter decomposition and the replacement.

In the particular embodiment where the weight matrix is used as the parameter set to be decomposed, new bias vectors can be calculated from the original bias vector B to set to the upper and lower layers. In a particular embodiment, a new bias vector $B_1$ for the upper layer may be preferably set to be identical to the original bias vector B of the one pre-trained hidden layer 160a and a new bias vector $B_2$ for the lower layer may be set to be zero ($B_1=B$; $B_2=0$; TYPE 1).

Hereinabove, the particular embodiment where the weight matrix M is used as the parameter set to be decomposed has been described. However, in other particular embodiment, both of the weight matrix M and the bias vector B can be used as the parameter set to be decomposed.

In the particular embodiment where the weight matrix M and the bias vector B are used as the parameter set, the matrix M' to be decomposed by SVD can be expressed by using the weight matrix M with an extended vector of the bias vector B with constant of 1 as follows:

$$M' = \begin{bmatrix} M & B \\ 0 & 1 \end{bmatrix}.$$

As shown in the aforementioned equation, the matrix M' has a block of the weight matrix M with zeros and a block of an extended bias vector arranged next to the block of the weight matrix M. The extended bias vector has a bias vector B of the one pre-trained hidden layer and a constant of 1 attached thereto.

Assuming that W denotes $\Sigma V^T$, the SVD applied to the weight matrix M' can be expressed by following block matrix form:

$$M' = U' \sum{}' V'^T = \begin{bmatrix} U & B_1 \\ 0 & 1 \end{bmatrix} \begin{bmatrix} \sum & 0 \\ 0 & 1 \end{bmatrix} \begin{bmatrix} V & B_2 \\ 0 & 1 \end{bmatrix},$$

$$= \begin{bmatrix} U & B_1 \\ 0 & 1 \end{bmatrix} \begin{bmatrix} W & B'_2 \\ 0 & 1 \end{bmatrix},$$

$$= \begin{bmatrix} UW & UB'_2 + B_1 \\ 0 & 1 \end{bmatrix},$$

where $B_2$' denotes $\Sigma B_2$.

By not considering the new bias vector $B_1$ and $B_2$, matrices U, $\Sigma$ and V can be obtained. New weight matrices for the first and second new parameter sets may be U and $\Sigma V^T$, respectively as similar to the aforementioned particular embodiment where the weight matrix M is used as the parameter set. The bias vectors for the first and second new parameter sets may be obtained from original bias vector B, the first orthogonal matrix U', the singular value matrix $\Sigma'$ and/or the second orthogonal matrix V'.

More specifically, considering given matrix M', U $B_2$'+$B_1$ should be equal to the original bias vector B. If the new bias vector $B_2$' for the lower layer is obtained from aforementioned equation, the new bias vector $B_1$ for the upper layer may be set to be a value calculated from the bias vector B and the new bias vector $B_2$ for the lower layer as follows:

$B_1 = B - UB'_2$ (TYPE 2).

The pre-training module 138 is configured to perform pre-training for the neural network by using at least a part of the given set of the training data. Before the pre-training, the output layer 168 currently obtained after previous pre-training may be discarded and a new output layer is added. By performing the pre-training, at least the parameter sets associated with the new multiple hidden layers are pre-trained based upon parameter sets given by the layer replacement module 136 as initial conditions. In a particular embodiment, whole of the neural network may be pre-trained by using the given set of the training data. In some embodiments, the pre-training is discriminative pre-training, in which discriminative information, i.e., that is class label, is used for error back-propagation procedure. However, in other embodiment, the pre-training is not limited to the discriminative pre-training, and generative pre-training, in which discriminative information are not used and reconstruction of input is performed, can also be employed.

The decomposition of the parameter set associated with one pre-trained hidden layer 160a by the decomposition module 134, the increase of the number of the hidden layer by the layer replacement module 136 and the pre-training for the neural network by pre-training module 138 may be repeatedly performed in a layer-by-layer manner until the number of the hidden layers (in the fully-connected layers 166) reaches a predetermined number.

Figure 5:
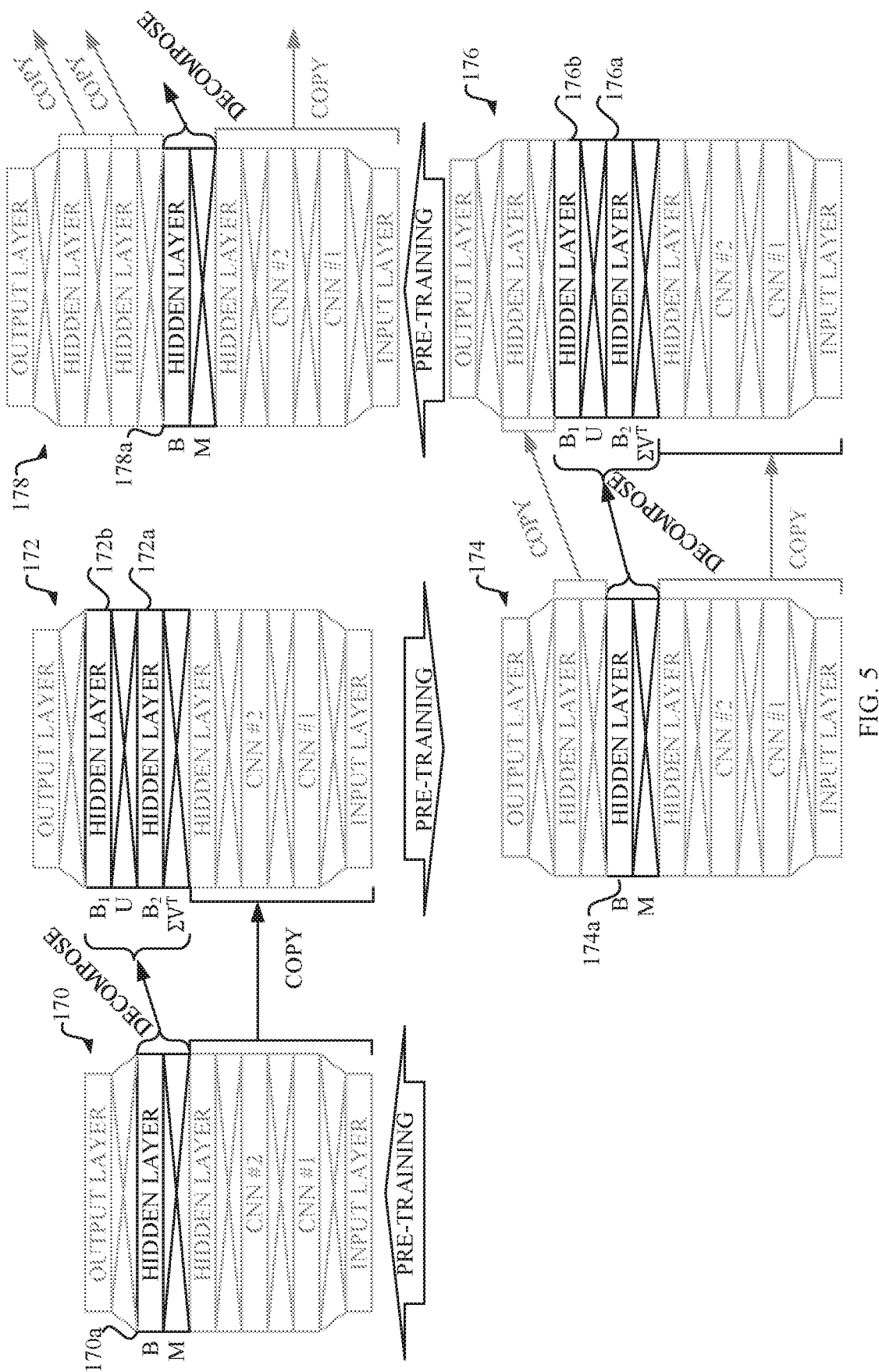
FIG. 5 describes a way of inserting new hidden layers into a neural network in accordance with at least one embodiment of the present invention.

FIG. 5 describes a way of inserting new hidden layers into the neural network. As show in FIG. 5, at first, a base 170 of the neural network 160 is prepared by any known pre-training method. The base 170 shown in FIG. 5 includes two convolutional layers and two hidden layers, each of which can be pre-trained by standard pre-training technique using the given set of the training data.

After given the base 170, a parameter set (M and/or B) associated with one hidden layer 170a that is pre-trained up to the current stage is decomposed into two new parameter sets (U and/or $B_1$ and $\Sigma V^T$ and/or $B_2$). Then, the one hidden layer 170a is replaced with two new hidden layers 172a, 172b to obtain a new neural network 172. The first new parameter set (U and/or $B_1$) is set to the upper layer 172b and the second new parameter set ($\Sigma V^T$ and/or $B_2$) is set to the lower layer 172a. In the neural network 172, structure below the lower layer 172a may be copied from the base 170 of previous stage and a new output layer are added on a top of the upper layer 172b. The neural network 172 after replacement may be subjected to the pre-training to obtain a new base 174 for next pre-training stage.

After given the new base 174, a parameter set (M and/or B) associated with one hidden layer 174a pre-trained up to the current stage is decomposed into two new parameter sets (U and/or $B_1$ and $\Sigma V^T$ and/or $B_2$). Then the one hidden layer 174a is replaced with two new hidden layers 176a, 176b. The first new parameter set (U and/or $B_1$) is set to the upper layer 176b and the second new parameter set ($\Sigma V^T$ and/or $B_2$) is set to the lower layer 176a. The neural network 176 after replacement may be subjected to the pre-training to obtain a further new base 178 for next pre-training stage.

The procedure, which includes insertion of a new hidden layer into the neural network and a discriminative pre-training for the neural network, may be performed repeatedly until the number of the hidden layers in the neural network reaches a predetermined number.

In general, any one of the pre-trained hidden layers, which corresponds to one of the fully-connected layers 166, can be targeted for parameter decomposition. However, in a preferable embodiment, during the layer-by-layer pre-training process, a position to be decomposed and to be inserted the new hidden layer are fixed to a positions having been decomposed and inserted in a previous stage as shown in FIG. 5. In FIG. 5, a position corresponding to the second fully-connected layer is always targeted for the parameter decomposition and new layer insertion during the whole pre-training process.

By inserting the new layers into the fixed position instead of inserting on a top hidden layer just below the output layer as done in standard discriminative pre-training, good quality error signals are expected to be back propagated in back propagation procedure of the discriminative pre-training.

After the number of the hidden layers in the neural network reaches the predetermined number, initial parameters of the whole neural network for subsequent fine-tuning, which includes the weight matrices and the bias vectors for all layers, are obtained. Finally, the whole neural network 160 is constructed by stacking the output layer 168 on the top hidden layers and by adding the connections between units of the top hidden layer and units of the output layer 168 with arbitrary parameters. The whole neural network 160 including the initial parameters and newly added arbitrary parameters are discriminatively tuned by updating the parameters using backpropagation algorithm during the supervised fine-tuning process. In the fine-tuning process, a training parameter such as a learning rate may be different from the discriminative pre-training. In some embodiments, the training process for the neural network 160 after the pre-training is not limited to the aforementioned techniques, any known training technique can be applicable to the neural network 160.

In particular embodiments, each of modules 130, 140 of the acoustic model training system 120 described in FIG. 1 as well as each of submodules 132-138 of the pre-training processing module 130 described in FIG. 4 may be implemented as, but is not limited to, the following: (i) a software module including program instructions and/or data structures in conjunction with hardware components such as a processor, a memory, etc.; (ii) a hardware module including electronic circuitry; and/or (iii) a combination thereof. Modules 130, 132, 134, 136, 138 and 140 described in FIG. 1 and FIG. 4 may be implemented on a single computer system such as a personal computer and a server machine or a computer system distributed over a plurality of devices such as a computer cluster of the computer devices. Also other components 102, 104, 106, 150 may be implemented on the same computer system that implements modules 130, 132, 134, 136, 138 and 140 or on another computer system.

The neural network 160 working as the acoustic model 110 is shown illustratively in FIG. 2. However, the neural network for the acoustic model 110 can be based on any one of known neural network architectures including other types of feedforward neural network such as a fully connected neural network, residual network, deep convolutional neural networks developed by Oxford's Visual Geometry Group (VGG). Also, in some embodiments, the acoustic model 110 may be a hybrid NN (Neural Network)-HMM model, where the neural network is used to directly compute observation probability distribution for each HMM state instead of standard Gaussian Mixture Models (GMM) in the GMM/HMM system. However, the acoustic model 110 is not limited to the aforementioned NN-HMM model. In other embodiment, the acoustic model 110 may be other type of NN-HMM model that is based on tandem or "bottleneck feature" approach, where the neural network is used to extract features as input for a subsequent system such as a standard GMM/HMM system and other neural network based system having different architecture or structure from the neural network in place of or in addition to standard acoustic features.

Figure 6:
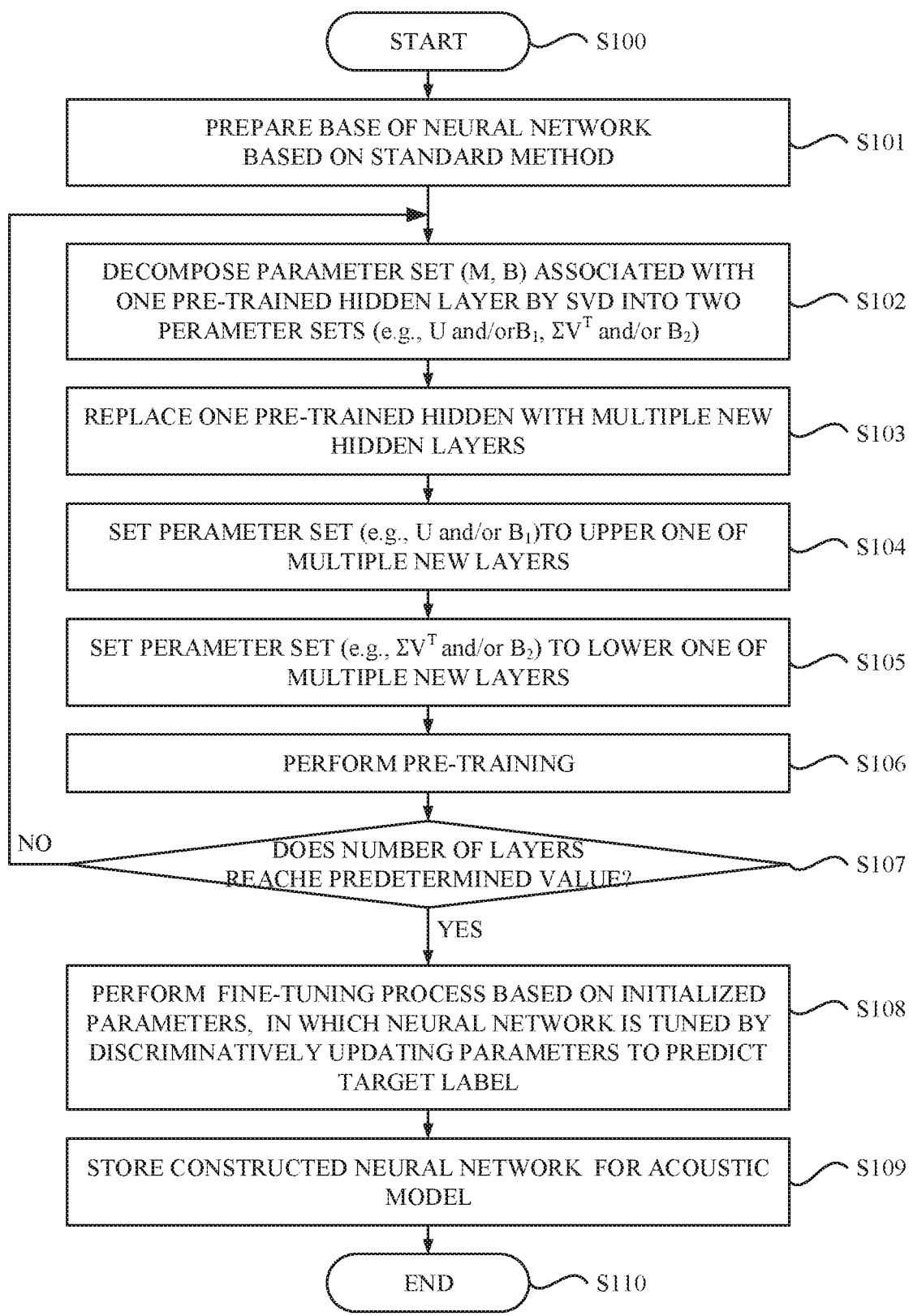
FIG. 6 is a flowchart depicting a novel training process for training a neural network based acoustic model in accordance with at least one embodiment of the present invention.

Referring to FIG. 6, a flowchart depicting novel training process for training a neural network-based acoustic model according to some embodiments of the present invention is shown. Note that the decomposition of the parameter set is done by the SVD in the training process shown in FIG. 6.

As shown in FIG. 6, process may begin at step S100 in response to receiving a request for initiating a training process from an operator. Note that the process shown in FIG. 6 may be performed by a processing circuitry such as a processing unit that implements the acoustic model training system 120 in FIG. 1, for the given speech data 150 stored in a storage device operably coupled to the processing unit.

At step S101, the processing unit may prepare a base of a neural network 160 based on standard method. In step S101, the base of the neural network 160 may be prepared by performing pre-training of convolutional layers 164 and pre-training of at least one hidden layer. At step S102, the processing unit may decompose a parameter set associated with one pre-trained hidden layer currently obtained in the neural network into two new parameter sets that is based on the orthogonal weight matrices U, V and the singular value matrix Z. The two new parameter sets may include a first new parameter set (U and/or $B_1$) and a second new parameter set ($\Sigma V^T$ and/or $B_2$).

At step S103, the processing unit may replace the one pre-trained hidden layer with two new hidden layers. At step S104, the processing unit may set the first new parameter set (U and/or $B_1$) to an upper layer of the two new hidden layers. At step S105, the processing unit may set the second new parameter set ($\Sigma V'$ and/or $B_2$) to a lower layer of the two new hidden layers.

By the processing from the step S103 to the step 105, the number of the hidden layers in the neural network may be increased by one using the two new parameter sets. At step S106, the processing unit may perform pre-training for the neural network 160, in which at least the two new hidden layers are pre-trained. In step S106, the discriminative pre-training, in which discriminative information is used for error back-propagation procedure, can be preferably performed.

At step S107, the processing unit may determine whether the number of the hidden layers in the neural network 160 reaches a predetermined number or not. In response to determining that the number of the hidden layers does not reach the predetermined number (S107: NO), the process may transfer to step S102 to proceed a next stage of pre-training.

In response to determining that the number of the hidden layers reaches the predetermined number (S107: YES), the process may transfer to step S108. At step S108, the processing unit may perform a fine-tuning process based on parameter initialized by the processing from the step S101 to the step 107, in which the neural network is tuned by discriminatively updating parameters to predict target class. At step S109, the processing unit may store the constructed neural network as the acoustic model 110 and the process may end at step S110.

According to one or more embodiments of the present invention, by decomposing a parameter set associated with one pre-trained hidden layer in the neural network into a plurality of new parameter sets and by increasing the number of the hidden layers in the neural network based at least in part on the plurality of the new parameter sets, a neural network with a desired depth can be efficiently built up and performance of speech recognition by using the built neural network is expected to be improved especially when the amount of training data is relatively small.

According to one or more embodiments of the present invention, by inserting the new layer into the fixed position, error signals are expected to be back propagated through the neural network while keeping the error signal with good quality in comparison with a standard way where the new layer having random parameters is inserted on a top hidden layer just below the output layer each time pre-training stage progresses, which eases error back propagation in the discriminative pre-training.

The languages to which the novel training function may be applied are not limited and include natural and designed human languages, computer languages, and the like.

Also note that in the embodiment having been described above, a neural network used for acoustic model 110 is described to be a target of the novel training function.

However, since a neural network is one of the most promising models used in a variety of recognition processing in addition to speech recognition, the neural network to be trained by the novel training function according to some embodiments may be a neural network used in other field such as image recognition processing, motion recognition processing, etc.

Experimental Study

A program implementing the system and process shown in FIGS. 1, 4-6 according to some embodiments was coded and executed for given training speech samples. A neural network based acoustic mode (NN-AM) shown in FIG. 2 with convolutional and max pooling layers, fully-connected layers and input and output layers was created as a target of the training process.

The number of the convolutional layers was two. The numbers of the localized filters in the first and second convolutional layers were 128 and 256, respectively. The fully-connected layers in the neural network included 6 hidden layers of 1024 hidden units. The number of units in the output layer of the neural network was 2000. Each unit in the output layer corresponded to each quin-phone HMM state.

15 hours of noisy speech data with manual transcriptions that is so-called Aurora-4 were prepared for training. 11 consecutive frames of Log Mel features having 40 frequency banks and its dynamic features (delta and delta-delta features) were used as input as represented by [40×3×11]. A class label was aligned to each center frame by the forced alignment technique based on standard GMM/HHM system.

As for comparative examples, the neural networks were trained by standard backpropagation algorithm without discriminative pre-training (Comparative Example 1), standard discriminative pre-training with inserting a new layer initialized with random value on a top below the output layer (Comparative Example 2), respectively. As for examples (Example 1 and Example 2), the neural networks were trained by the training process shown in FIG. 6 with respective bias vectors (TYPE 1 and TYPE 2). As for other example (Example 3), the neural network was trained by the training process shown in FIG. 6 without decomposition, where the new layer initialized with random values was inserted to fixed position each time pre-training stage progressed during the pre-training process.

In the examples and the comparative examples, after the training of the neural network was completed, the neural network from the input layer to the output layer was stored as the acoustic model. The test speech data including test data sets labeled with "clean" and "noisy" in the Aurora-4 were used. ASR accuracy of the obtained speech recognition models was evaluated for the examples and the comparative examples by using several test data sets. WER (Word Error Rate) was utilized as ASR accuracy metric.

Unless otherwise noted, any portions of the speech recognition model except for way of training of the acoustic model were approximately identical between the examples and the comparative examples. The final topologies of the neural network in the examples were identical to that of the comparative examples. The subsequent fine-tuning after the pre-training in the examples (Example 1-3) was also identical to that of the comparative example 2.

The evaluated results of the examples and the comparative examples are summarized as follows:

| | Test Condition | | | | |
|---|---|---|---|---|---|
| | wv1 (matched channel condition) | | wv2 (mismatched channel condition) | | |
| Acoustic Model | Clean | Noisy | Clean | Noisy | average |
| Comparative Example 1 (w/o discriminative pre-training) | 4.61 | 8.08 | 7.58 | 16.35 | 11.34 |
| Comparative Example 2 (w/discriminative pre-training that inserts on a top hidden layer) | 4.54 | 8.20 | 6.93 | 15.40 | 10.96 |
| Example 1 (w/discriminative pre-training that inserts a new layer initialized with decomposed parameter set (including TYPE 1 bias) to fixed position) | 4.32 | 7.80 | 6.52 | 14.71 | 10.42 |
| Example 2 (w/discriminative pre-training that inserts a new layer initialized with decomposed parameter set (including TYPE 2 bias) to fixed position) | 4.46 | 7.55 | 6.44 | 14.79 | 10.35 |
| Example 3 (w/discriminative pre-training that inserts a new layer initialized with random parameter set to fixed position) | 4.45 | 7.91 | 6.82 | 15.04 | 10.64 |

The baseline NN-AMs showed 11.34% (Comparative Example 1) and 10.96% (Comparative Example 2) WER for average. By comparison with the result of the comparative examples, WERs of all examples were shown to be reduced, indicating improvement of recognition accuracy. Even Example 3, where discriminative pre-training that merely inserts a new layer initialized with random parameter set to a fixed position without decomposition was performed, showed improvement of recognition accuracy. Among the examples, Example 2 showed best performance.

It was confirmed that accuracy of speech recognition can be improved by the novel training function that inserts a new layer initialized using decomposed parameter sets, is performed. Also it was confirmed that accuracy of speech recognition can be improved even when discriminative pre-training that inserts a new layer initialized with random parameter sets to the fixed position is performed.

Computer Hardware Component

Figure 7:
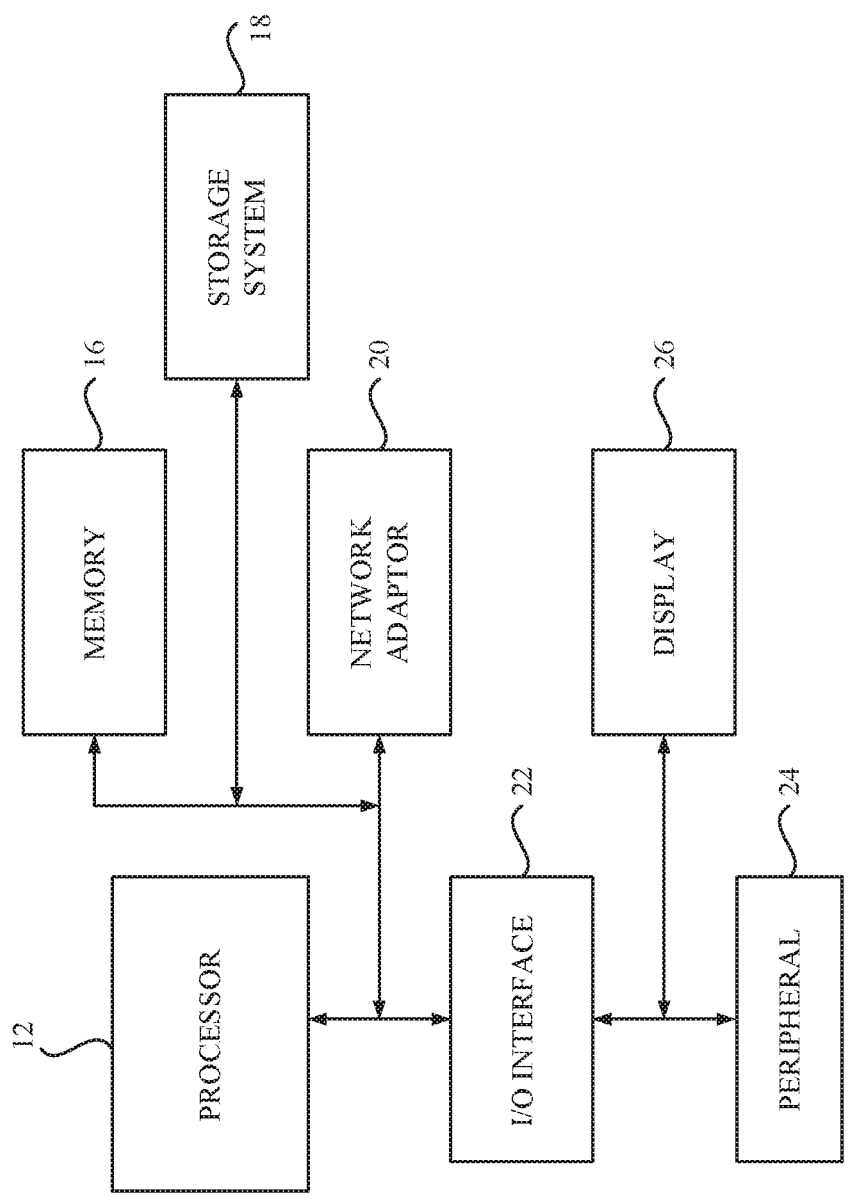
FIG. 7 depicts a schematic of a computer system in accordance with at least one embodiment of the present invention.

Referring now to FIG. 7, a schematic of an example of a computer system 10, which can be used for the speech recognition system 100, is shown. The computer system 10 shown in FIG. 7 is implemented as computer system. The computer system 10 is only one example of a suitable processing device and is not intended to suggest any limitation as to the scope of use or functionality of embodiments of the invention described herein. Regardless, the computer system 10 is capable of being implemented and/or performing any of the functionality set forth hereinabove.

The computer system 10 is operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, handheld or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 7, the computer system 10 is shown in the form of a general-purpose computing device. The components of the computer system 10 may include, but are not limited to, a processor (or processing circuitry) 12 and a memory 16 coupled to the processor 12 by a bus including a memory bus or memory controller, and a processor or local bus using any of a variety of bus architectures.

The computer system 10 typically includes a variety of computer system readable media. Such media may be any available media that is accessible by the computer system 10, and it includes both volatile and non-volatile media, removable and non-removable media.

The memory 16 can include computer system readable media in the form of volatile memory, such as random access memory (RAM). The computer system 10 may further include other removable/non-removable, volatile/non-volatile computer system storage media.

By way of example only, the storage system 18 can be provided for reading from and writing to a non-removable, non-volatile magnetic media. As will be further depicted and described below, the storage system 18 may include at least one program product having a set (e.g., at least one) of program modules that are configured to carry out the functions of embodiments of the invention.

Program/utility, having a set (at least one) of program modules, may be stored in the storage system 18 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 10 may also communicate with one or more peripherals 24 such as a keyboard, a pointing device, a car navigation system, an audio system, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via bus. It should be understood that although not shown, other hardware and/or software components could be used in conjunction with the computer system 10. Examples, include, but are not limited to: microcode, device drivers, redundant processing units, external disk drive arrays, RAID systems, tape drives, and data archival storage systems, etc.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for training a neural network including an input layer, one or more hidden layers, and an output layer, the method comprising:
   preparing a base of the neural network, the base having at least a pre-trained hidden layer;
   decomposing a parameter set, associated with one pre-trained hidden layer in the neural network, into a plurality of new parameter sets;
   increasing the number of the hidden layers in the neural network based at least in part on the plurality of new parameter sets, wherein increasing the number of hidden layers in the neural network includes:
      replacing the one pre-trained hidden layer with multiple new hidden layers;
      setting a first parameter set of the plurality of new parameter sets to an upper layer of the multiple new hidden layers; and
      setting a second parameter set of the plurality of new parameter sets to a lower of the multiple new hidden layers; and
   pre-training the neural network.

2. The method of claim 1, wherein the decomposing, the increasing and the pre-training are repeatedly performed in a layer-by-layer manner until the number of the hidden layers in the neural network reaches a predetermined number while the decomposing is applied to a same position in the neural network.

3. The method of claim 1, wherein the parameter set is represented by a matrix at least partially and the decomposing comprises:
applying singular value decomposition to the matrix to generate a first orthogonal matrix, a singular value matrix and a second orthogonal matrix, the plurality of the new parameter sets being based on the first orthogonal matrix, the singular value matrix and the second orthogonal matrix.

4. The method of claim 3, wherein:
the matrix has a weight matrix connected to the one pre-trained hidden layer;
the first new parameter set includes a first weight matrix obtained from the first orthogonal matrix; and
the second new parameter set includes a second weight matrix obtained from the second orthogonal matrix.

5. The method of claim 3, wherein the parameter set further includes:
a bias vector of the one pre-trained hidden layer;
the first new parameter set includes a first bias vector; and
the second new parameter set includes a second bias vector, the first bias vector and the second bias vector being calculated by using the bias vector of the one pre-trained hidden layer.

6. The method of claim 5, wherein the first bias vector is set to be identical to the bias vector of the one pre-trained hidden layer and the second bias vector is set to be zero.

7. The method of claim 4, wherein:
the matrix has a block of an extended bias vector arranged next to a block of the weight matrix in the matrix, the extended bias vector having a bias vector of the one pre-trained hidden layer and a constant of 1 attached thereto;
the first new parameter set includes a first bias vector; and
the second new parameter set includes a second bias vector, the second bias vector being obtained by the singular value decomposition for the matrix, the first vector being set to be a value calculated by using the bias vector of the one pre-trained hidden layer and the second bias vector.

8. The method of claim 2, wherein the pre-training is discriminative pre-training and the method further comprises:
fine-tuning the neural network after the number of the hidden layers in the neural network reaches the predetermined number.

9. The method of claim 1, wherein the one or more hidden layers of the neural network includes one or more fully-connected layers under the output layer and one or more convolutional layers between the input layer and the one or more fully-connected layers, and one layer of the one or more fully-connected layers after previous pre-training is targeted as the one pre-trained hidden layer for the decomposing.

10. The method of claim 1, wherein the neural network is a neural network based acoustic model.

11. A computer system training a neural network including an input layer, one or more hidden layers and an output layer, by executing program instructions, the computer system comprising:
a memory storing the program instructions;
a processing circuitry in communications with the memory for executing the program instructions, wherein the processing circuitry is configured to:
prepare a base of the neural network, the base having at least a pre-trained hidden layer;
decompose a parameter set associated with one pre-trained hidden layer in the neural network into a plurality of new parameter sets;
increase the number of hidden layers in the neural network based at least in part on the plurality of new parameter sets, wherein increasing the number of hidden layers in the neural network includes:
replacing the one pre-trained hidden layer with multiple new hidden layers;
setting a first parameter set of the plurality of new parameter sets to an upper layer of the multiple new hidden layers; and
setting a second parameter set of the plurality of new parameter sets to a lower of the multiple new hidden layers; and
pre-train the neural network.

12. The computer system of claim 11, wherein the decomposition, the increase, and the pre-training are repeatedly performed in a layer-by-layer manner until the number of the hidden layers in the neural network reaches a predetermined number while the decomposition of the parameter set is applied to same position in the neural network.

13. The computer system of claim 11, wherein the parameter set is represented by a matrix at least partially and the parameter set is decomposed by applying singular value decomposition to the matrix to generate a first orthogonal matrix, a singular value matrix, and a second orthogonal matrix, the plurality of the new parameter sets being based on the first orthogonal matrix, the singular value matrix and the second orthogonal matrix.

14. The computer system of claim 12, wherein the pre-training is discriminative pre-training and the processing circuitry is further configured to:
fine-tune the neural network after the number of the hidden layers in the neural network reaches the predetermined number.

15. A computer program product for training a neural network including an input layer, one or more hidden layers and an output layer, the computer program product comprising a computer readable storage medium having program instructions embodied therewith, the program instructions executable by a computer to cause the computer to perform a method comprising:
preparing a base of the neural network, the base having at least a pre-trained hidden layer;
decomposing a parameter set, associated with one pre-trained hidden layer in the neural network, into a plurality of new parameter sets;
increasing the number of the hidden layers in the neural network based at least in part on the plurality of new parameter sets, wherein increasing the number of hidden layers in the neural network includes:
replacing the one pre-trained hidden layer with multiple new hidden layers;
setting a first parameter set of the plurality of new parameter sets to an upper layer of the multiple new hidden layers; and
setting a second parameter set of the plurality of new parameter sets to a lower of the multiple new hidden layers; and
pre-training the neural network.

* * * * *